(12) United States Patent
Feced et al.

(10) Patent No.: US 7,469,106 B2
(45) Date of Patent: Dec. 23, 2008

(54) REFERENCE PHASE AND AMPLITUDE ESTIMATION FOR COHERENT OPTICAL RECEIVER

(75) Inventors: Ricardo Feced, Sawbridgeworth (GB); Robin Rickard, Spellbrook (GB); Epworth Richard, Sawbridgeworth (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 800 days.

(21) Appl. No.: 10/780,430

(22) Filed: Feb. 17, 2004

(65) Prior Publication Data

US 2005/0180760 A1 Aug. 18, 2005

(51) Int. Cl.
*H04B 10/06* (2006.01)
*H04B 10/04* (2006.01)

(52) U.S. Cl. .................. 398/202; 398/183; 398/192

(58) Field of Classification Search .......... 398/183–211
See application file for complete search history.

(56) References Cited

U.S. PATENT DOCUMENTS

| | | | | |
|---|---|---|---|---|
| 5,168,509 A | * | 12/1992 | Nakamura et al. | .......... 375/286 |
| 5,351,148 A | * | 9/1994 | Maeda et al. | .................. 398/76 |
| 6,025,946 A | * | 2/2000 | Miyamori et al. | ............ 398/185 |
| 7,054,375 B2 | * | 5/2006 | Kannan et al. | ............... 375/260 |
| 7,110,681 B1 | * | 9/2006 | Mizuochi | ..................... 375/286 |
| 7,218,850 B2 | * | 5/2007 | Stuart | ........................... 398/26 |
| 2003/0103771 A1 | * | 6/2003 | Atmur et al. | ................. 398/152 |

OTHER PUBLICATIONS

U.S. Appl. No. 10/626,384, filed Jul. 23, 2003, Epworth.
U.S. Appl. No. 10/679,824, filed Oct. 6, 2003, Rickard.
J Stott, "The Effects of Phase Noise in COFDM", EBU Technical Review—Summer 1998.

* cited by examiner

*Primary Examiner*—M. R. Sedighian
(74) *Attorney, Agent, or Firm*—Barnes & Thornburg LLP

(57) ABSTRACT

An optical receiver demodulates optical orthogonal frequency division multiplexed signals and generates a number of subcarrier reference signals, each for demodulating a frequency channel of the frequency division multiplexed signals. It compensates for degradations in the generated reference signals by averaging a number of estimates derived from different inputs to make the references more resilient to degradations. It can encompass time averaging to compensate for amplification noise, and frequency averaging of phase drift estimation to compensate for phase drift caused by reduced source coherence. It can enable longer system reach and/or increased optical power margins by means of better system resilience to amplification noise and reduced source coherence. The bit error rate can be reduced, and/or the capacity can be increased by increasing bit rate or introducing more frequency channels.

18 Claims, 7 Drawing Sheets

SUB CARRIER REFERENCE GENERATOR WITH TIME AVERAGING AND FREQUENCY AVERAGED PHASE DRIFT CORRECTION

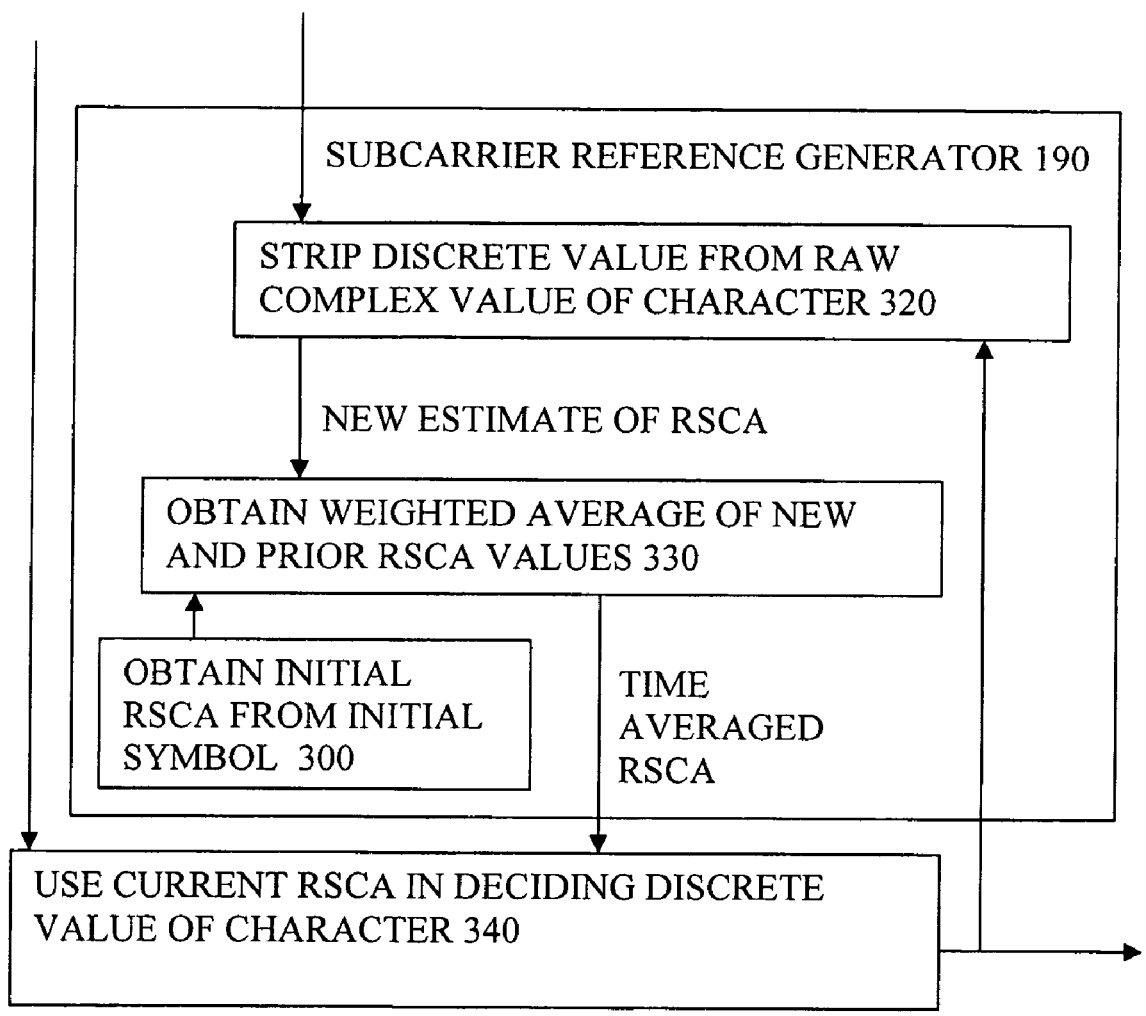
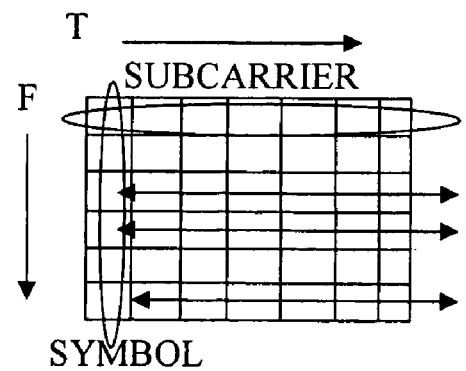
FIG 3. SUBCARRIER REFERENCE FOR EACH FREQUENCY OBTAINED BY AVERAGING VALUES DETERMINED AT DIFFERENT TIME INTERVALS

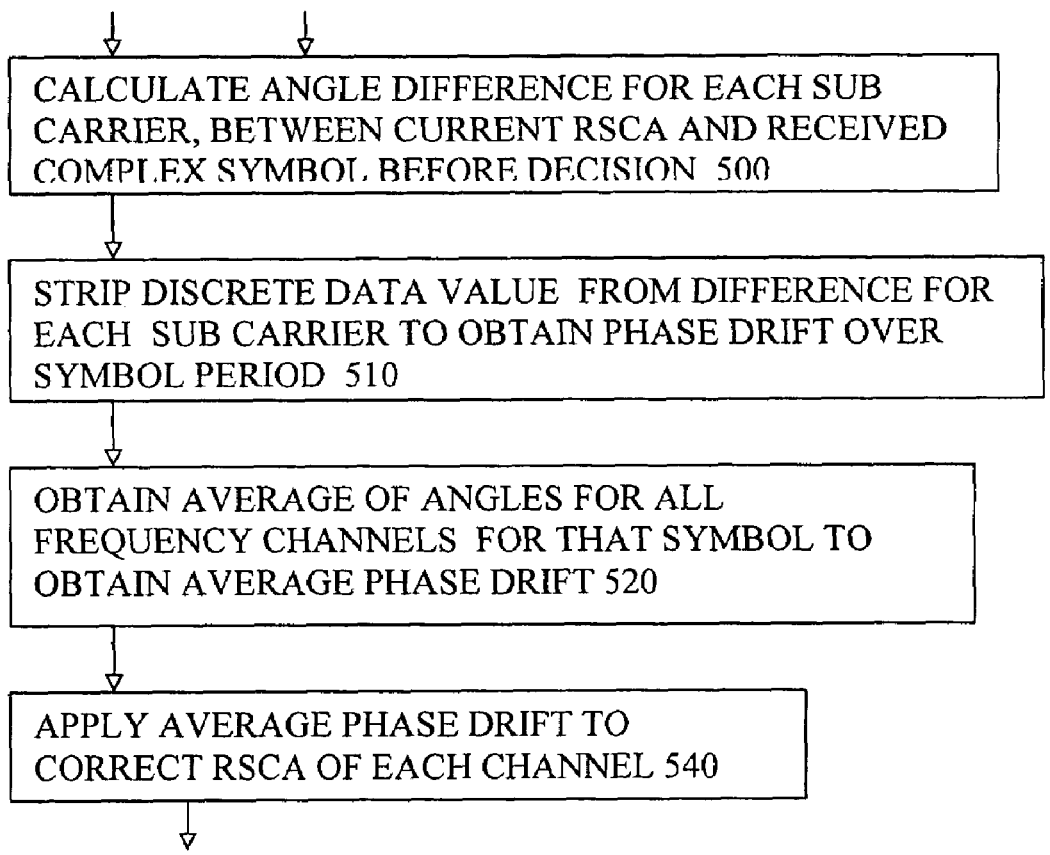
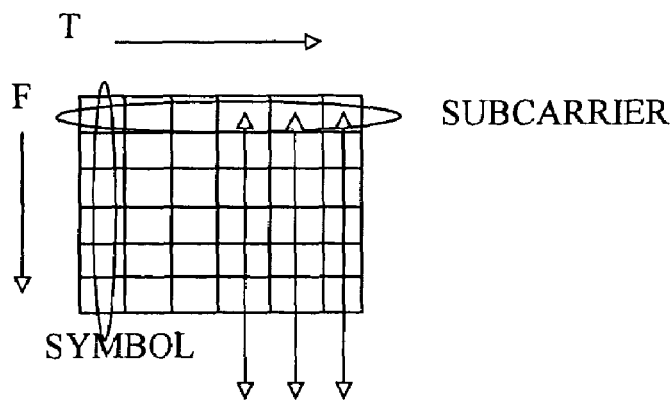
FIG 5. SUBCARRIER REFERENCE PHASE DRIFT AT EACH TIME INTERVAL IS OBTAINED BY AVERAGING VALUES DETERMINED AT ALL FREQUENCIES

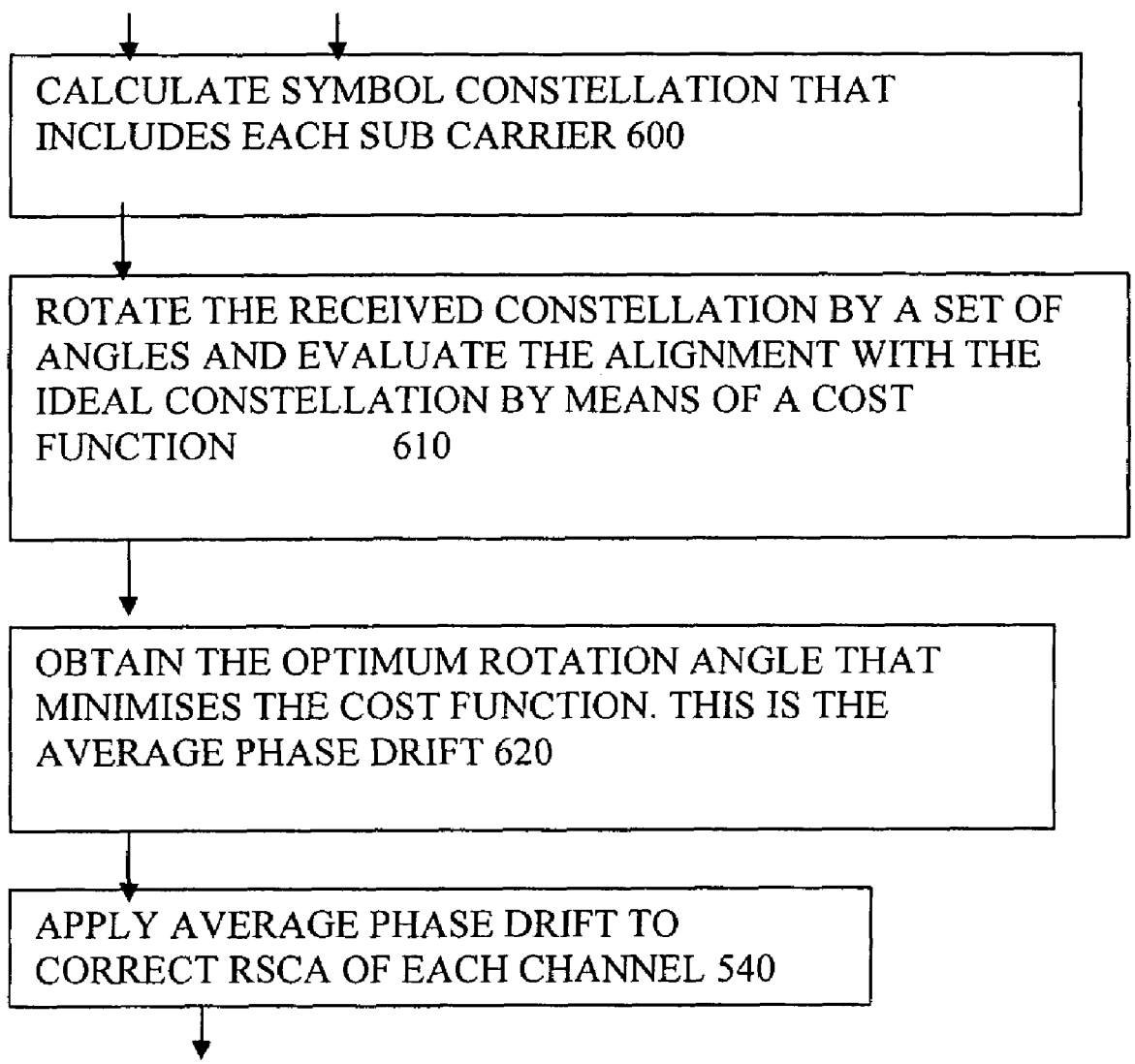
FIG 6 PHASE DRIFT CORRECTION BY CONSTELLATION ROTATION

FIG 8 ENCODING
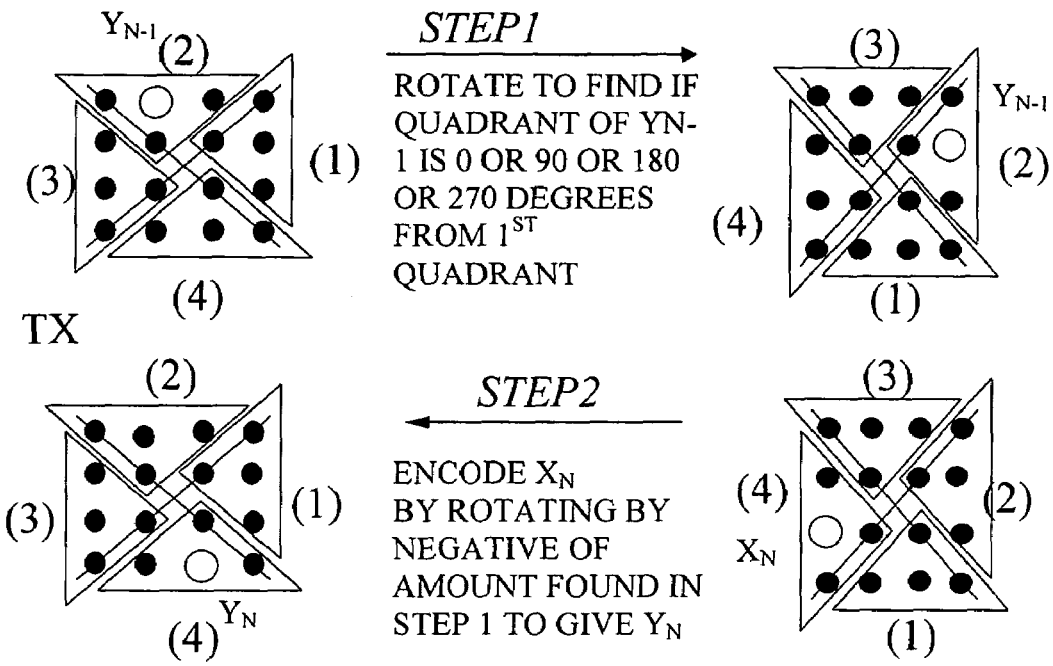
FIG 9 DECODING
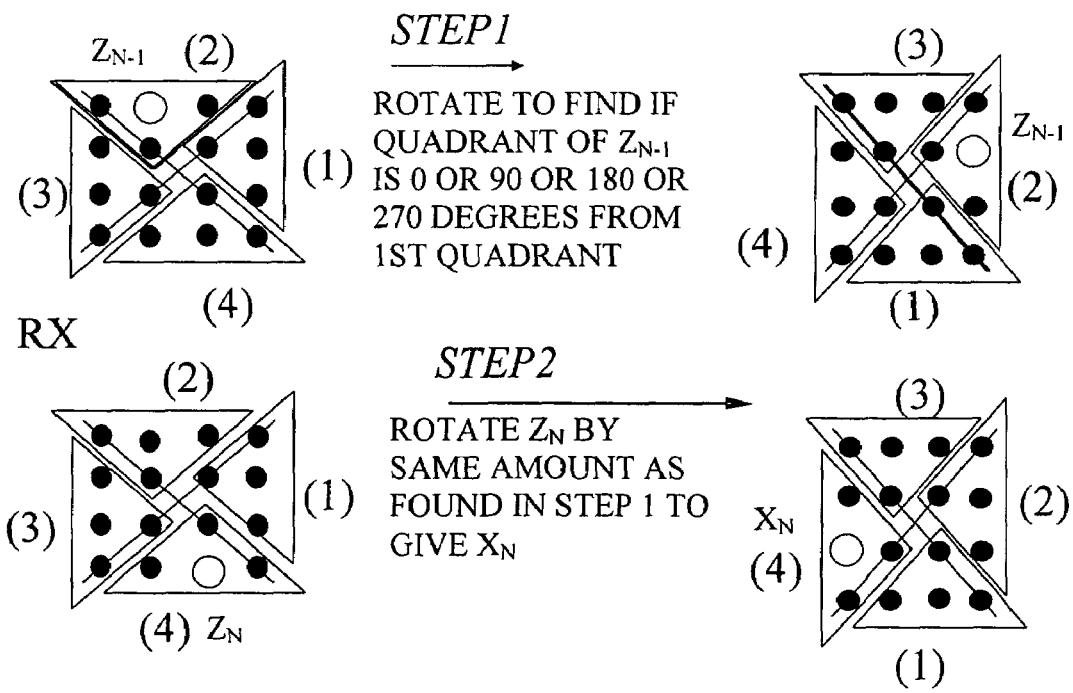

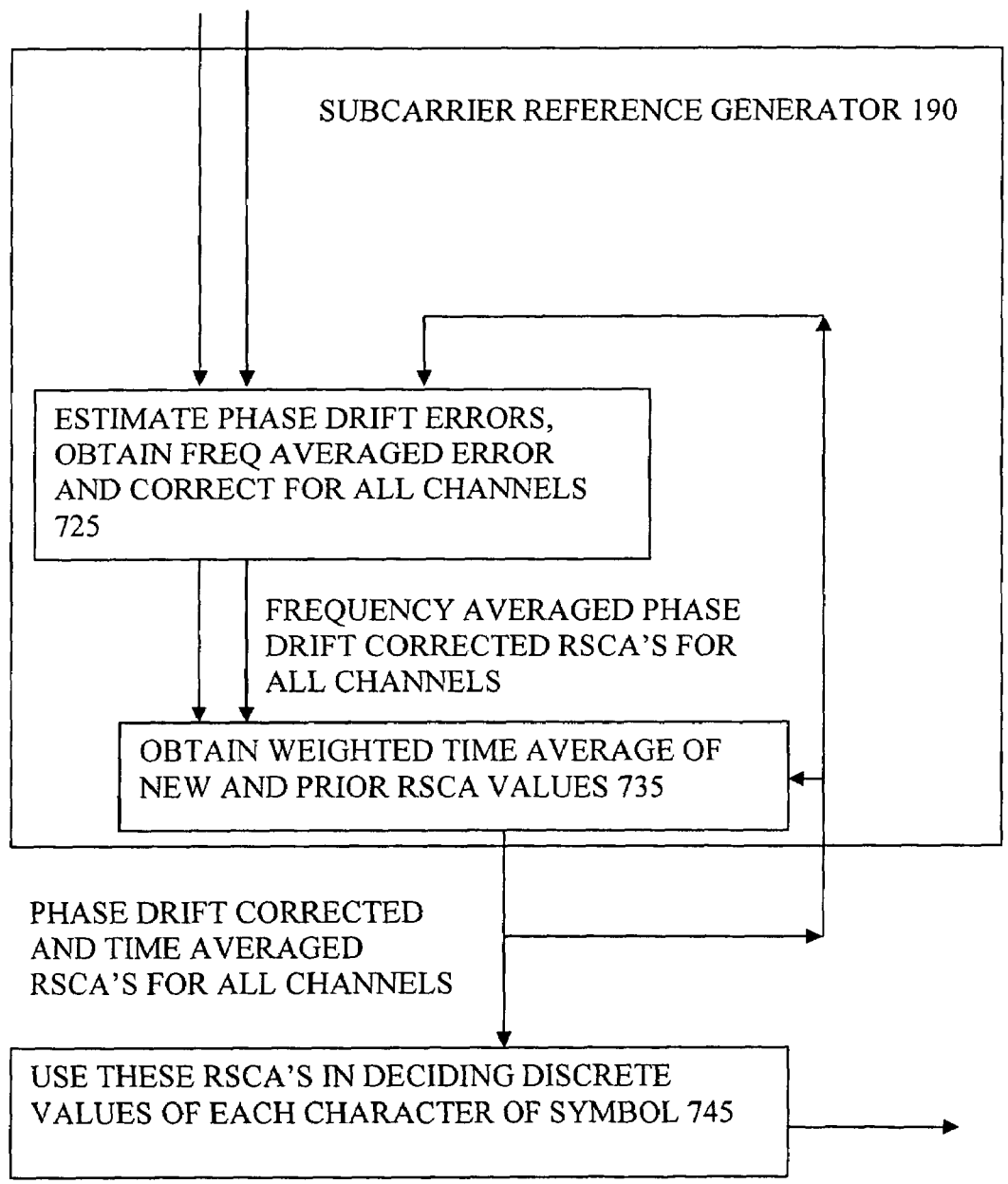
FIG 10 SUB CARRIER REFERENCE GENERATOR WITH TIME AVERAGING AND FREQUENCY AVERAGED PHASE DRIFT CORRECTION

REFERENCE PHASE AND AMPLITUDE ESTIMATION FOR COHERENT OPTICAL RECEIVER

RELATED APPLICATIONS

This invention relates to U.S. patent application entitled "Optical Sub-carrier Multiplexed Transmission" (Nortel Networks file 16231ID) Ser. No. 10/679,824 filed on 6 Oct. 2003 and U.S. patent application entitled "MLSE across closely coupled optical channels" (Nortel Networks file 15980ID) Ser. No. 10/626,384 filed on 23 Jul. 2003, both incorporated herein by reference in their entirety.

FIELD OF THE INVENTION

This invention relates to receivers, to demodulators, to subcarrier reference generators, phase noise correctors, to corresponding software, to corresponding methods and to methods of offering a transmission service over such apparatus.

BACKGROUND OF THE INVENTION

Orthogonal Frequency Division Multiplexing (OFDM) communication systems exhibit high resilience to linear distortion impairments because the information is encoded in the frequency domain. For this reason, the implementation of an optical OFDM system has become an option actively investigated, as shown in the above referenced pending U.S. patent application Ser. No. 10/679,824. However optical communication systems suffer more severely from certain impairments than radio communication systems, for which the OFDM technique was initially developed. The successful use of OFDM in the optical arena will depend on how satisfactorily it is possible to ameliorate the impact of these impairments.

One of the main limitations of optical communication systems is the optical noise generated in amplification stages which are usually needed every 50-100 km. Consequently, it is of crucial importance to establish the optimum demodulation technique in order to minimise the impact of noise without adding any unnecessary overheads.

Another limitation of coherent-type optical communication systems is the reduced coherence of the laser optical sources in comparison with their radiofrequency counterparts. It is also necessary to establish adequate phase-noise reduction techniques to be able to operate optical OFDM systems with realistic and currently available optical sources.

Orthogonal Frequency Division Multiplexing (OFDM) systems encode the information as a concatenation of blocks in the frequency domain. An inverse fast Fourier transform converts the information to the time domain before its transmission along the channel. A fast Fourier transform at the receiver recovers the original transmitted sequence.

The main advantage of OFDM is that if a guard-band with cyclic prefix is included before transmission, then the received sequence is the circular convolution of the input signal with the channel response. This permits a very easy equalisation of linear impairments, as circular convolutions become products in the Fourier domain where the information is encoded. The only limitation is that the time interval over which the channel impulse-response-time extends should be smaller than the size of the allocated guard-band.

It is also known to apply MLSE (Maximum Likelihood Sequence Estimation) to multi-carrier radio receivers using joint demodulation techniques to reduce co-channel interference (ICI). In this joint demodulation technique, symbols of the desired signal are decoded by an MLSE process at the same time as symbols of a dominant interference source. The estimated contribution of the interference source is subtracted out to decode the desired signal and the estimated contribution of the desired signal is subtracted out to decode the interference source. All possibilities of the received contribution from the desired signal and the interference source are tried, and a "score" (e.g., a viterbi decoding metric) is kept for each.

However, ICI in radio transmissions is fundamentally different to ICI in optical fibers and so radio techniques are not generally appropriate for optical systems. One such difference is that the transmission medium is dispersive in optical systems, meaning that signals of different frequencies travel at different velocities. Another fundamental difference is that the nonlinear cross coupling between intensity and phase occurs along the fiber, whereas in radio systems, there is no such distributed nonlinearity. In contrast, nonlinearities in radio systems are highly localized, being caused by a very few discrete nonlinear elements. Each such localized nonlinearity is readily compensated using a discrete compensating nonlinearity. This method is not feasible in an optical fiber system, as the fiber nonlinearity interacts with the dispersion in a complex distributed manner. Hence most cross coupling or ICI in radio systems can be modeled and pre or post compensated, whereas this is not effective for optical ICI. Also, notably the bit rates in radio systems are lower and so there is more time within the bit period, for complex processing techniques. Hence where the reach performance is limited by optical nonlinearity in the fiber, current practice is to minimise nonlinear interaction between channels by spacing the channels in frequency and using chromatic dispersion to minimise the nonlinear interaction/cross coupling (by walkoff/dephasing). Where the modulation format uses multiple-phases (such as QPSK), it is currently necessary to reduce the operating power levels to minimize the impairments due to nonlinear coupling between these nominally orthogonal phase channels.

If OFDM is implemented in optical communication systems as shown in the above referenced pending U.S. patent application Ser. No. 10/679,824, the transmitted information can be encoded in frequency by means of a given phase/amplitude modulation format like QPSK, QAM 16, QAM 32 and similar formats. The polarisation dimension can also be exploited by polarisation multiplexing. The receiver employs a coherent-type detection scheme whereby the in-phase and quadrature components of the signal are measured. Schemes that detect either only one polarisation or two orthogonal polarisations can be implemented, the second one being preferred to enhance transmission capacity. Linear impairments, like chromatic and polarisation mode dispersion, can be easily equalised once the received sampled signal is converted back to the frequency domain to extract the original data.

Standard OFDM for radio systems offers two approaches for data demodulation, either in a pilot-tone based scheme or in a differentially-detection scheme:

Pilot-tone scheme: reference pilot-tones with known data are transmitted along with the desired information, and used in the receiver to recover a reference signal for each frequency channel (subcarrier) to demodulate the data. The reference signal is built along time by an averaging process, so that it is virtually noiseless, providing good resilience against additive white Gaussian noise as it attains the coherent detection limit. However, the transmission of pilot tones containing known information constitutes an overhead that wastes part of the channel capacity, and which is not necessary in the differentially-detection scheme. Also the complexity of the receiver will be high.

Differential detection scheme: In this scheme the data is demodulated by comparing consecutive sampled symbols corresponding to the same frequency channel. There is a performance difference between the two schemes in relation to their resilience to additive white Gaussian noise (AWGN), and the possibility of phase error correction. No overhead is required but it exhibits a signal-to-noise ratio penalty with respect to pilot tones. No phase error correction technique has been implemented in this scheme.

It is known from EBU technical review summer 1998, J Stott, "The effects of Phase noise in COFDM", that there are two types of phase noise, a common phase error common to all the channels and a thermal noise-like part which is not pure phase noise. COFDM is coded orthogonal frequency division multiplexing. It shows that a pilot tone scheme can be implemented with phase error correction circuitry in order to correct for common phase errors in a digital video broadcast system.

In optical systems, AWGN introduced at each amplification stage is usually one of the performance limiting factors. The OFDM-pilot-tone based scheme exhibits the same Bit Error Rate (BER) versus Optical Signal-to-Noise Ratio (OSNR) performance as its equivalent coherently detected modulation formats. Analogously, the OFDM-differentially-detected scheme also exhibits the same BER-OSNR performance as its equivalent differentially-detected modulation format. For instance, coherent-QPSK detection has an OSNR margin of ~2.4 dB at a BER of $10^{-3}$ with respect to differential-QPSK.

SUMMARY OF THE INVENTION

It is an object of the present invention to provide improved apparatus and methods. According to a first aspect of the present invention, there is provided an optical receiver arranged to receive and demodulate optical orthogonal frequency division multiplexed signals, and having a subcarrier reference generator arranged to generate a number of subcarrier reference signals, each for use in demodulating a different one of a number of frequency channels of the frequency division multiplexed signals, the subcarrier reference generator further being arranged to compensate for degradations in the generated reference signals by averaging a number of estimates derived from different inputs.

By using an average of a number of estimates, the reference can be made more accurate, and so more resilient to any of a variety of degradations. Embodiments of this invention can thus complement OFDM by enabling longer system reach and/or increased optical power margins by means of better system resilience to amplification noise and reduced source coherence. If the reference is more accurate, the bit error rate can be reduced, and/or the capacity can be increased by increasing bit rate or introducing more frequency channels. The estimates can encompass estimates of the reference signal values or estimates of the values of the degradation for example. The different inputs can encompass inputs such as data received at different time instances or of different frequency channels or partially demodulated or partially corrected data or combinations of these and other parameters for example. The average can be a weighted average, weighted to favor inputs closer to the reference value concerned, or can be any type of combination of the inputs for example.

An additional feature of some embodiments, suitable for a dependent claim is, the generator being arranged to compensate for phase drift by determining estimates at a number of different frequencies and averaging these estimates. Phase drift errors can be a particular limitation for optical systems since laser sources typically introduce considerable phase drift over the relevant time intervals. For a given transmission rate, the more channels there are, the greater the time between successive data portions of the same channel, and so the greater is the susceptibility to phase drift. Averaging over a number of frequencies can enable a more accurate determination of the drift and therefore more accurate compensation for it.

Another such additional feature is the generator being arranged to compensate for noise by determining estimates for a given one of the reference signals at a number of different times and averaging these estimates. Such a time averaging can enable the reference to be less susceptible to noise such as Gaussian noise.

Another such additional feature is the generator being arranged to compensate for phase drift by determining estimates at a number of different frequencies and averaging these estimates, and to compensate for noise by determining estimates for a given one of the reference signals at a number of different times and averaging these estimates. This combination can have some synergistic effect, in that noise performance can be improved if the averaging is carried out on phase drift corrected estimates and vice versa.

Another such additional feature is the optical receiver being arranged to demodulate differentially coded optical orthogonal frequency division multiplexed signals, the generator being arranged to operate without using a transmitted pilot tone. The use of differentially coded signals is useful as it does not require the transmission of a pilot tone for demodulation.

Another such additional feature is the optical receiver being arranged to demodulate non differentially coded optical orthogonal frequency division multiplexed signals. This can give improved phase noise resilience with respect to current common phase noise reduction techniques.

Another such additional feature is the generator being arranged to generate the estimated reference signals by stripping detected data from a received signal for each channel. This is a key part of a decision directed algorithm and is an efficient way of generating the reference signals because it minimizes the impact of additive Gaussian noise in the estimation of the reference.

Another such additional feature is the generator being arranged to generate an estimated phase drift by estimating a rotation of a constellation of points represented in a frequency domain. In this technique, for each received symbol a constellation is built that includes all the unprocessed subcarriers detected. This constellation is subsequently rotated for a different number angles and the overlap with the ideal constellation is evaluated by means of a cost function. The angle yielding a minimum for this cost function represents an estimate of the phase drift.

This is an alternative way to estimate the phase drift that is very superior for formats such as 16-32 QAM, where phase drift estimation with data stripping algorithms would not be applicable due to their low tolerance to phase drifts. This lack of phase tolerance is due to the tightly packed constellation exhibited by this modulation formats.

Another such additional feature is the optical receiver being arranged to receive signals carrying data bits which have been encoded before transmission by a rotation in a complex frequency domain, relative to other data bits and the receiver having a decoder for decoding by using the other data bits to determine an amount of rotation of the data bits, needed to decode the data bits. An advantage of this is that such relative encoding enables more resilience to phase jumps of greater than 45 degrees between symbols, which become more likely with longer symbols.

Another such additional feature is a coherent optical domain receiving section, and an electrical demodulation section arranged to carry out a Fast Fourier Transform, and to use the subcarrier reference signals for detection of data in the fourier transformed signals. This is a particularly efficient way of dividing the processing between optical and electrical domains, and of achieving demodulation, other ways are conceivable in principle.

Another aspect of the invention provides a demodulator for a receiver for orthogonal frequency division multiplexed signals, and having a subcarrier reference generator arranged to generate a number of subcarrier reference signals, each for use in demodulating a different one of a number of frequency channels of the frequency division multiplexed signals, the subcarrier reference generator further being arranged to compensate for degradations in the generated reference signals by averaging a number of estimates derived from different inputs.

Another additional feature is the generator being arranged to compensate for phase drift by determining estimates at a number of different frequencies and averaging these estimates, and to compensate for noise by determining estimates for a given one of the reference signals at a number of different times and averaging these estimates.

Another such additional feature is the demodulator being arranged to demodulate differentially coded optical orthogonal frequency division multiplexed signals, the generator being arranged to operate without using a transmitted pilot tone.

Another such additional feature is the demodulator being in the form of software. This acknowledges that software can be a valuable, separately tradable commodity. It is intended to encompass software, which runs on or controls "dumb" or standard hardware, to carry out the desired functions, (and therefore the software essentially defines the functions of the demodulator, and can therefore be termed a demodulator, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a subcarrier reference generator for a demodulator for orthogonal frequency division multiplexed signals, the generator being arranged to generate a number of subcarrier reference signals, each for use in demodulating a different one of a number of frequency channels of the frequency division multiplexed signals, the subcarrier reference generator further being arranged to compensate for degradations in the generated reference signals by averaging a number of estimates derived from different inputs.

Another aspect of the invention provides a subcarrier reference generator for generating subcarrier reference signals for use in demodulating optically transmitted orthogonal frequency division multiplexed signals, by generating a number of subcarrier reference signals, each for use in demodulating a different one of a number of frequency channels of the frequency division multiplexed signals, and comprising means for compensating for degradations in the generated reference signals by averaging a number of estimates derived from different inputs.

This corresponds to the first aspect but uses "means for" language, to give different claim scope.

Another aspect provides an optical receiver arranged to receive and demodulate optical orthogonal frequency division multiplexed signals carrying higher order QAM data values encoded by a mapping in a complex frequency domain according to corresponding other data values, the receiver having a subcarrier reference generator arranged to generate a number of subcarrier reference signals, a demodulator for demodulating the optical orthogonal frequency division multiplexed signals using each of the subcarrier reference signals for a respective frequency channel of the frequency division multiplexed signals, and a decoder for decoding after the demodulating, by determining from the corresponding other data values, an inverse mapping in the complex frequency domain needed to decode the data values.

An advantage of such relative encoding and relative decoding, using other data values rather than an absolute reference, is that it can enable more resilience to phase jumps of greater than + or − 45 degrees between symbols, which become more likely with longer symbols. Such advantages can apply with or without the subcarrier generator with averaging discussed above.

As an additional feature, the mapping and inverse mapping comprises a rotation.

An advantage of using rotational encoding is that it can provide better resilience to such phase jumps than other mappings.

As an additional feature, the rotation can be any of 0, 90, 180, or 270 degrees.

This is one way of allowing rotation of a conventional QAM constellation of points without altering the constellation. The constellation can be divided into groups of points forming a triangle or a square for example. Other angles or ways of grouping can be conceived.

Another aspect of the invention provides an optical transmitter arranged to transmit an optical orthogonal frequency division multiplexed signal carrying higher order QAM data values, the transmitter having:

an encoder for encoding the data values by carrying out a mapping in a complex frequency domain according to corresponding others of the data values, and a modulator for modulating the encoded data values to form the optical orthogonal frequency division multiplexed signal having a number of frequency channels.

Another aspect provides a method of generating subcarrier reference signals for use in demodulating optically transmitted orthogonal frequency division multiplexed signals, by generating a number of subcarrier reference signals, each for use in demodulating a different one of a number of frequency channels of the frequency division multiplexed signals, and by compensating for degradations in the generated reference signals by averaging a number of estimates derived from different inputs.

Another such additional feature is the step of compensating for phase drift by determining estimates at a number of different frequencies and averaging these estimates.

Another aspect provides a method of offering a data transmission service over an optical link, the data being transmitted using optical orthogonal frequency division multiplexed signals, and being received using an optical receiver having a subcarrier reference generator arranged to generate a number of subcarrier reference signals, each for use in demodulating a different one of a number of frequency channels of the frequency division multiplexed signals, the subcarrier reference generator further being arranged to compensate for degradations in the generated reference signals by averaging a number of estimates derived from different inputs. This reflects the position that if the link is enhanced, then data transmission services over the network can be enhanced, and the value of such services can increase as a direct consequence. Such increased value of transmission services over the life of the system, could prove far greater than the sales value of the equipment.

Any of the features can be combined with each other and with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 2 shows an example of a subcarrier reference generator which can be used in the receiver of FIG. 1, and uses time averaging, according to an embodiment, FIG. 3 shows a graphical representation of the characters of the data symbols, FIG. 4 shows an example of phase drift correction for a subcarrier reference generator according to another embodiment, using frequency averaged phase drift correction, FIG. 5 shows a graphical representation of the characters of the symbols in the frequency domain, showing the effect of frequency averaging, FIG. 6 shows another example of phase drift correction using constellation rotation, FIGS. 8 and 9 show such encoding and corresponding decoding at the receiver in schematic form, and FIG. 10 shows a subcarrier reference generator with time averaging and frequency averaged phase drift correction according to another embodiment.

DETAILED DESCRIPTION OF PREFERRED EMBODIMENTS

Figure 1:
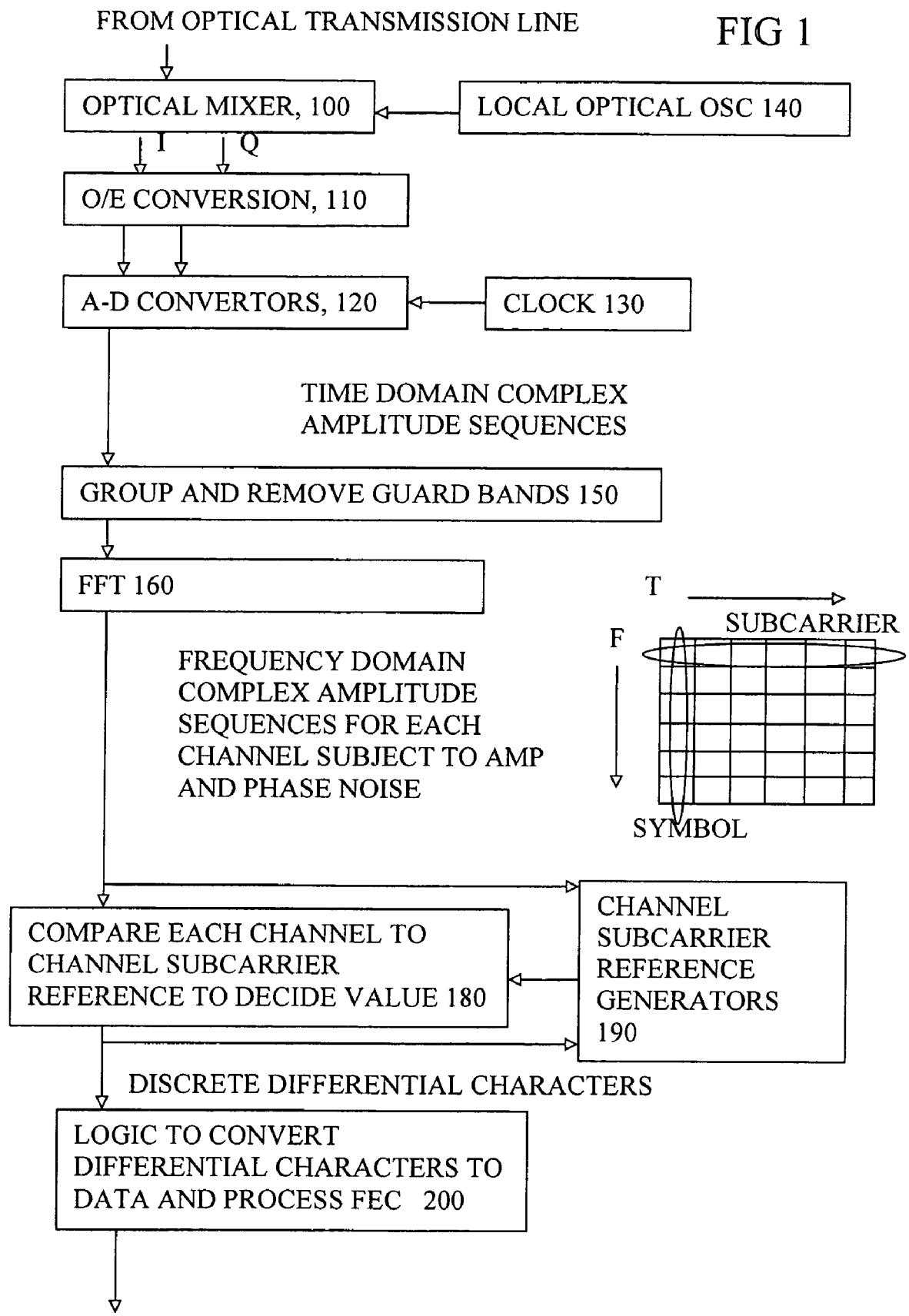
FIG. 1 shows an example of an optical receiver according to an embodiment.

Some embodiments described address how to enhance the noise robustness of OFDM without the overhead of transmitting pilot tones. The technique described can be called decision driven averaged carrier recovery. Other embodiments introduce a method to correct for phase drifts in the optical source also without need of pilot tone transmission. Embodiments of the demodulation techniques described can approach the noise resilience of the coherent limit but without the additional overhead of the pilot tones. The data can be differentially encoded in the transmitter, so that transmission of any reference signals or pilot tones is not always necessary. The combination of both techniques can be used to minimise the impact of the amplification noise and the reduced laser coherence that would otherwise affect optical OFDM.

Minimising the impact of additive white Gaussian noise involves generating a subcarrier reference also termed a Reference Subcarrier Complex-Amplitude (RSCA) for each of the frequency channels by means of a decision directed algorithm. For each channel, the first symbol is taken as initial RSCA, which will be upgraded symbol after symbol. Each new sampled symbol is compared with respect to the current RSCA and, as a result of the comparison, a decision is made about its value. One step in this is to strip the estimated discrete value from the actual complex value of the noisy received symbol to obtain a new estimate of the reference subcarrier RSCA. The new estimate of RSCA is used in conjunction with the previous reference to improve its accuracy by means of weighted average between them.

The correction of the common phase errors involves averaging over the different subcarriers at a given moment in time. In this patent we describe two possible alternatives. The first one is based on data stripping and is particularly useful for modulation formats with low complexity, like QPSK and its differential versions. The second technique is based on estimation of optimum constellation rotation for a given symbol, and it exhibits clear superiority for more complex modulation formats like 16-32 QAM.

The first algorithm is illustrated for the QPSK modulation format and proceeds in two stages. First for each frequency channel (subcarrier) the angle difference between the received symbol's complex amplitude and expected RSCA is calculated. This angle is then multiplied by four (mod $2\pi$) to strip the data. This is equivalently to data stripping by a fourth order phase lock loop. The result will give an idea of the phase drift of the source in the time scale corresponding to the whole 32-symbol length. In a second stage the angles previously calculated for each of the frequency channels are averaged. The result is divided by four to estimate a unique phase drift value. This phase drift value is applied to each of the RSCAs to estimate the phase drifted RSCA before the data demodulation. In summary, the phase noise correction is obtained by looking into the correlations among the various frequency channels.

In the second technique, phase drift is estimated by evaluating the rotation of the constellation of points represented in the frequency domain. For each received symbol a constellation is built that includes all the unprocessed subcarriers detected. This constellation is subsequently rotated for a different number angles and the overlap with the ideal constellation is evaluated by means of a cost function. The angle yielding a minimum for this cost function represents an estimate of the phase drift. This is an alternative way to estimate the phase drift that is useful for formats such as 16-32 QAM, where phase drift estimation with data stripping algorithms would not be applicable due to their low tolerance to phase drifts. This lack of phase tolerance is due to the tightly packed constellation exhibited by this modulation formats.

The applicability of these techniques for subcarrier recovery, phase error correction, and demodulation extends to any possible phase/amplitude modulation format used for coding the OFDM symbols. This will include BPSK, QPSK, 16-32 QAM and similar modulation formats. The techniques can address how to enhance AWG noise robustness and combat common phase noise in OFDM without the overhead of transmitting pilot tones.

FIG. 1 Optical Receiver for Receiving OFDM Signals.

FIG. 1 shows some of the principal elements of an optical receiver for receiving optical orthogonal frequency division multiplexed signals. It includes an optical front end for coherently receiving the optical signal from the optical transmission line. This part includes an optical mixer 100, and a local oscillator 140, and output IQ signals. These are converted to electrical form by differential optical to electrical converters 110. These output analogue signals which are passed to analogue to digital converters 120. Here they are converted to digital signals by sampling with a sampling clock 130. At this point, the digital signals represent time domain complex amplitude sequences. The functions after this point can be carried out by circuitry such as digital signal processing hardware, microprocessors, or application specific integrated circuits, as appropriate. The functions can be implemented in conventional software languages to run on the hardware. To achieve real time processing at data rates conventionally used in existing optical systems, fast hardware is needed, though techniques such as parallel processing can be used to enable clock rates to be lowered.

At 150 the sequences are grouped into the symbols that were transmitted. In a typical example there may be 32 data characters in the form of one or more complex numbers depending on the modulation format, making up each symbol. Guard bands are conventionally provided between the symbols, to allow for channel degradation. These are removed by this function. Next a fast Fourrier transform (FFT) 160 function is carried out on each symbol. This returns each symbol to the frequency domain, thus the digital samples represent frequency domain complex amplitude sequences. As shown in the graph included in FIG. 1, at this point the data can be represented graphically with the x axis representing time, and the y axis representing different frequencies. A first symbol includes the boxes illustrated as being at the same time instant, but at different frequencies. This is illustrated by the first column of boxes, where each box represents one data character, which may be a complex value, or for some modulation formats, eg 16 QAM, (Quadrature Amplitude Modulation) a constellation of 16 complex values.

As represented by the graph in FIG. 1, after the FFT operation, each frequency channel is represented by a horizontal row of boxes at the same frequency for successive time instances. At function 180, the data characters for each channel are subject to amplitude and phase noise, and are typically multi-bit digital values, which need to be compared to a subcarrier reference for that channel, to decide a true discrete logical value for each data character. Hence subcarrier reference generators 190 are provided for each channel. At function 200, if the data is transmitted as differential data, logic is provided to convert differential characters to the original data, and to carry out FEC (forward error correction) processing. The detection stage represented by functions 180 and 200 can incorporate techniques such as MLSE as described in more detail in the above referenced pending application Ser. No. 10/626,384.

The operation of these receiver functions will now be described. An incoming OFDM-Amplitude/Phase modulated optical signal is coherently detected by optically mixing with the local oscillator. This is usually achieved by optical hybrids and differential detectors. Sampling the output of these detectors produces the time domain in-phase and quadrature components. The standard OFDM demodulation involves grouping the received sequence in blocks, removing the guardbands for each block, and carrying out a fast Fourier transform to recover the frequency-domain transmitted complex amplitude sequence for one symbol after another. For each frequency channel (subcarrier), a sequence is recovered with the original amplitude/phase modulation format. The complex symbol sequence for each frequency channel appears multiplied by the spectral response of the channel corresponding to that frequency, and is also corrupted by noise.

As discussed previously, in order to demodulate the data a differential comparison between adjacent complex symbols can be carried out, with the corresponding noise penalty; or recover a reference subcarrier from transmitted pilot tones, with the corresponding capacity overhead. The alternative solution described here is to generate the subcarrier with the help of a decision directed averaging algorithm in order to obtain almost the same noise resilience of the pilot-tone approach but without its capacity overhead. Optionally this can also involve a common phase error correction as part of the process, described below with reference to FIGS. 4-7. The technique developed to minimise the impact of additive white Gaussian noise is called decision driven averaged carrier generation for each of the frequency channels. It can be carried out by the channel subcarrier reference generator function 190. This can generate the reference signals according to an average of a number of estimates. This part will be described in more detail with reference to FIG. 2 onwards.

FIGS. 2, 3 Subcarrier Generator Using Time Averaging

FIG. 2 shows some of the principal elements of a subcarrier generator which exploits time averaging to overcome degradations due to Gaussian noise. At step 320 a raw noisy symbol before decision by part 180 of FIG. 1's input. The discrete value after the decision is stripped from the raw complex value, to give a new estimate of the subcarrier reference value (RSCA). Function 300 shows obtaining an initial RSCA from an initial raw symbol for the initial state that no decision has yet been made. At function 330 a weighted average of the new and prior RSCA values is obtained. There are a number of ways of implementing this. For example, a number of prior values can be stored in a shift register, and the parallel outputs of the shift register can be weighted and added. Alternatively a single prior value can be stored, and a proportion of the new value added to the prior value. The result of the addition can be used at the time averaged output, and at the same time can be fed back to be stored as the prior value for the next time interval. Function 340 shows how the time averaged RSCA is used in the comparison with the raw noisy symbol, to decide the discrete value. This is essentially equivalent to step 180 of FIG. 1. A subcarrier reference is generated for each of the subcarriers, and a decision is made separately for each of the subcarriers. For a given time interval, the decisions of each of the characters using the different subcarriers are carried out, and the individual characters can be reassembled into the symbol transmitted. The next symbol can then be assembled in the same fashion.

FIG. 3 is a representation of the effect of the time averaging carried out by the elements of FIG. 2. As in the graphical representation in FIG. 1, the symbols are represented by columns, and each subcarrier is represented by rows. Each box represents a character, which is a complex value or constellation of complex values. The horizontal arrows along the rows represent the effect of time averaging. Individual estimates of the subcarrier reference are obtained for each of the boxes. The effect of the time averaging is to take an average of a number of the boxes along a single row.

In other words, for a particular frequency channel, the subcarrier recovery algorithm starts by taking the first noisy amplitude as initial Reference Subcarrier Complex-Amplitude (RSCA). The second noisy symbol is then processed by comparing it first with the RSCA, and making a decision about its value (relative to the reference). Once that decision is made, the data on the second noisy symbol is stripped to align it approximately with the initial reference. A new reference signal is then calculated as a weighted average of the current reference estimate and the initial reference.

The process then carries on iteratively. A new noisy complex symbol is considered; its value is estimated against the current averaged RSCA; this value is subsequently stripped from the noisy symbol, which is left approximately aligned with the current reference signal. Finally a new estimation of the RSCA is made.

The weight attached to the present estimate of the reference signal in the averaging process governs the effective number of symbols over which the averaging is carried out. The smaller this number, the larger the number of symbols involved in the averaging. In order to approach the coherent BER-OSNR limit a value of 0.25 or lower can be used. However, even with a value of 0.5 a noticeable benefit in noise resilience can be obtained, for a given size of symbol and other parameters.

The BER-OSNR characteristics can be measured for optical OFDM with various parameters. One example uses QPSK formatting (10 Gbs, 32 subcarriers, so 32 characters per symbol), other examples can use differential-QPSK. Better performance in terms of BER-OSNR characteristic can be obtained for smaller weighting factors, i.e. more averaging, and can reach the coherent limit.

FIG. 4-6 Subcarrier Reference Generation with Phase Drift Correction

FIG. 4 shows in schematic form some of the principal elements of subcarrier reference generation with phase drift correction. At function 500, an angle difference is calculated between the current subcarrier reference RSCA and the received complex symbol in its raw state before decision. Next, the discrete data value is stripped from this difference, for each subcarrier to obtain an estimate for the phase drift over the symbol period, at 510. Next, at 520 an average of these angles for some or all of the frequency channels for the given symbol is obtained. This results in a frequency averaged phase drift value. At 540, the frequency averaged phase drift is applied to correct the subcarrier reference RSCA of each of the channels.

This process is represented graphically in FIG. 5. This figure corresponds closely to FIG. 3. In this case, the arrows extending vertically along the columns of boxes represent the effect of frequency averaging of the phase drift correction value. The phase drift is estimated for each of the boxes. Each box represents a data character of a symbol. The frequency averaged phase drift value is determined by averaging the phase drift values calculated for each of the boxes in a column as shown in FIG. 5.

In other words, the algorithm proceeds in two stages. First the phase drift is estimated. For low complexity modulation formats like QPSK for each frequency channel (subcarrier) the angle difference between the received symbol's complex amplitude and expected RSCA is calculated, the data are then stripped, and the residual angle differences averaged. For more complex modulation formats, like 16-32 QAM, the constellation rotation technique of FIG. 6 would be used and the optimum rotation angle estimated. The result represents the phase drift of the source in the time scale corresponding to the whole 32 character length of the symbol. In a second stage the angles previously calculated for each of the frequency channels are averaged, and the result is divided by four to estimate a unique phase drift value. This phase drift value is applied to each of the RSCA to estimate the phase drifted RSCA before the data demodulation. In summary, the phase noise correction is obtained by looking into the correlations among the various frequency channels.

This frequency averaging enables the impact of phase noise to be reduced and a more accurate correction for common phase drift among all the subcarriers to be made. This is particularly important given the reduced coherence of optical sources.

FIG. 6 shows a constellation rotation technique for estimating the phase drift by evaluating the rotation of the constellation of points represented in the frequency domain. For each received symbol a constellation is built at step 600. This includes all the unprocessed subcarriers detected. This constellation is subsequently rotated at step 610 for a number of different angles. At each angle, there is an evaluation of the alignment with an optimum rotation angle using a cost function. At step 620 the angle yielding a minimum for this cost function is determined. This represents an estimate of the phase drift. As before, at step 540 the average phase drift is used to correct the RSCA of each channel.

Such a constellation-directed algorithm can track the reference phase very effectively to address the issue of laser phase noise which can be a major source of degradation in OFDM optical systems due to reduced coherence of optical sources and the long duration of symbols. Such algorithms could suffer from an occasional cycle slip if the common phase jump for a symbol is higher than $(+/-\pi/4)$. Such phase-induced cycle slips in high order QAM-OFDM can have catastrophic effects because the error will propagate. The problem does not apply to differentially coded techniques such as examples using QPSK as in FIG. 4, since this does not rely on an absolute phase reference. One way to address this problem for the examples using higher order e.g. 16 or 32 QAM as in FIG. 6 will now be discussed. It involves incorporating partially-differential encoding at the transmitting side and a corresponding decoding at the receiving side.

FIGS. 7-9

Figure 7:
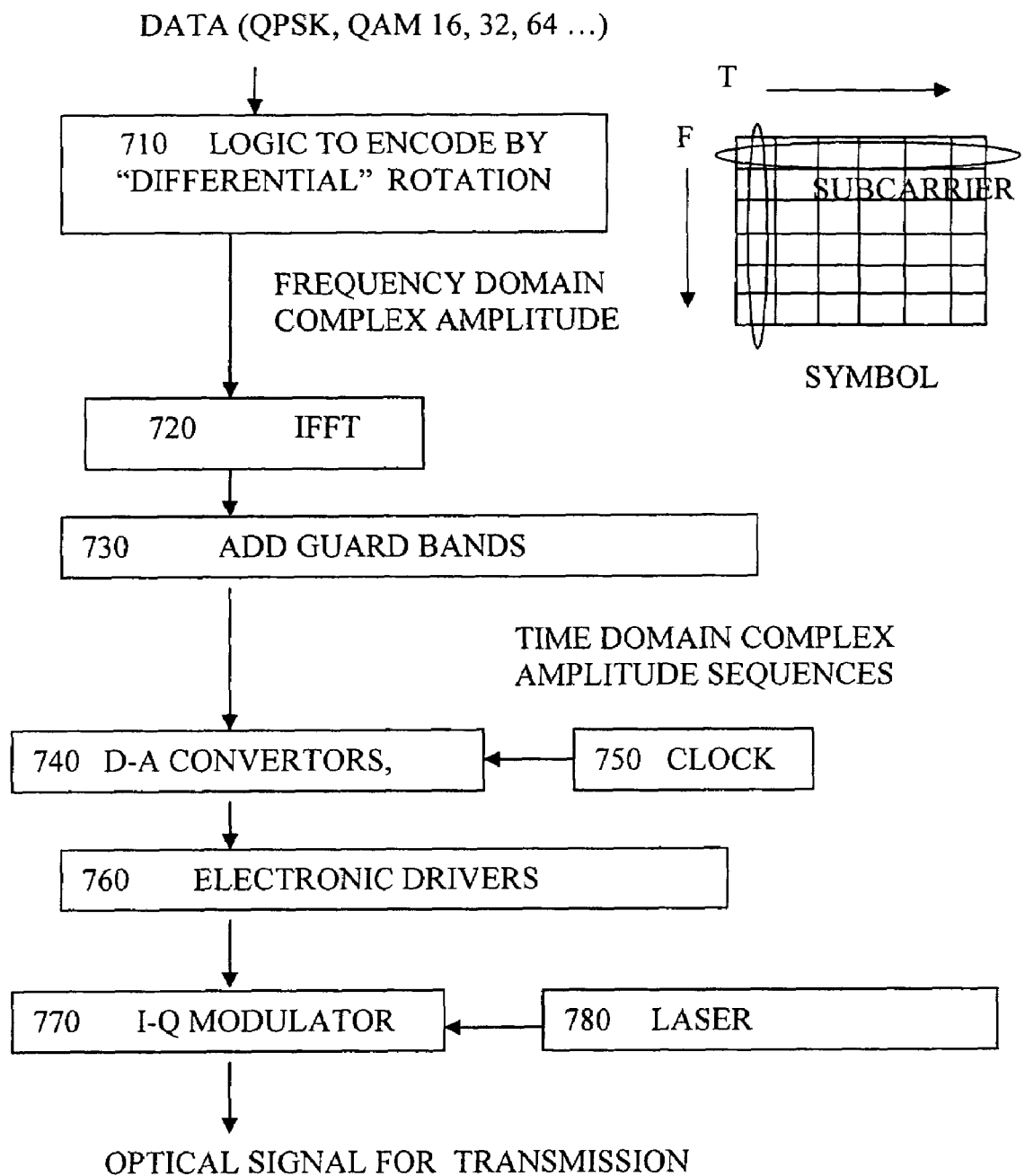
FIG. 7 shows an example of a transmitter having rotational encoding.

FIG. 7 shows an example of a transmitter incorporating the encoding, for use with a corresponding receiver having a decoder. FIG. 8 shows schematically the relative rotation encoding carried out in the transmitter of FIG. 7. FIG. 9 shows schematically the corresponding relative rotation for the decoding in the receiver. In FIG. 7, input data in the form of a QAM constellation at step 710 is encoded by a relative mapping such as a rotation, as will be explained in more detail below. At step 720, an IFFT operation is carried out to convert frequency domain complex amplitude data to the time domain. Guard bands are added at step 730. The transmitter also includes D-A convertors 740 clocked by clock 750. Electronic drivers 760 feed an I-Q modulator 770 to modulate light from a laser 780 to create the optical signal for transmission.

The example of the encoding and decoding algorithm described here involves dividing the (QAM) constellation in four quadrant groups of points as shown in FIGS. 8 and 9. Each quadrant can be assigned a QPSK value (from 1 to 4), and the points of the constellation in each quadrant can be called a QPSK-group. The algorithm involves encoding the data value for each subcarrier in symbol n by reference to the value of the same subcarrier in symbol n−1. If it is assumed that the information in a particular subcarrier is given by the string of M-QAM $\{x_n\}$ where n=1 to N. The encoding process produces the set of values $\{y_n\}$ from where n=0 to N.

The encoding process for $x_n$ is shown in FIG. 8. It has the following 2 steps between the 2 pairs of states shown in the figure. Both steps should be carried out in the period of one data value:

1. Take $y_{n-1}$ known from previous encoding, (or initially it is set as $y_0$ arbitrarily), then identify the QPSK-group to which $y_{n-1}$ belongs, or rotate the reference frame until $y_{n-1}$ belongs to Group 1. The angle of rotation $\phi$ can have the values $0, \pi/2, \pi, 3\pi/2$.

2. Take the constellation point corresponding to $x_n$ in the rotated frame. Rotate back $x_n$ by $-\phi$ found in step 1, to obtain the encoded $y_n$, then make n=n+1 and repeat steps.

The result of the encoding is data values which are partially differential relative to the preceding data value. They are complex values with a reference frame whose rotation in steps of 90 degrees which is set by the preceding data value. But each value is not expressed as a difference from the preceding data value, so they are not differential values. Decoding is shown schematically in FIG. 9. In the receiving side, decoding is carried out after the FFT and comparison of each frequency channel to its subcarrier reference, so can be carried out by element 200 of FIG. 1. Decoding can be represented as converting a received set $\{z_n\}$ back to $\{x_n\}$. It is assumed that the received set $\{z_n\}$ is equal to the original transmitted encoded set $\{y_n\}$ except for sudden cycle slips. Cycle slips are rotations of $+/-\pi/2$. If the cycle slip operators are represented by $C^{+/-}$, a typical received sequence $\{z_n\}$ will be:

$\{y_0, y_1, y_2, y_3, \underline{C^+y_4}, C^+y_5, C^+y_6, C^+C^+y_7, C^+C^+y_8, C^+C^+y_9, C^+C^+y_{10}, \underline{C^-C^+C^+y_{11}}, C^-C^+C^+y_{12}, C^-C^+C^+y_{13}, C^-C^+C^+y_{14}, \underline{C^+C^-C^+C^+y_{15}} \ldots\}$ where the cycle slip events are underlined.

The decoding algorithm can be shown as 2 steps between the 2 pairs of states shown in FIG. 9:

1. Take $z_{n-1}$ & $z_n$ and find the angle $\psi$ required for $z_{n-1}$ to be rotated to the first QPSK group. The angle of rotation $\psi$ can have the values $0, \pi/2, \pi, 3\pi/2$, depending on which quadrant or QPSK-group $y_{n-1}$ belonged to.
2. Take $z_n$ and rotate it by this angle $\psi$ to give: $T_{104}z_n$. Take this as the decoded value $x_n$ equal to $T_\psi z_n$. Make n=n+1 and repeat steps.

The decoded data will be in error if there is a cycle slip, but the error will not propagate to following symbols due to the relative encoding. Due to the averaging techniques the degradation in required OSNR should be minimal.

FIG. 10 Subcarrier Reference Generator with Combination of Time Averaging and Frequency Averaged Phase Drift Correction.

FIG. 10 shows in schematic form some of the principal functions in a subcarrier reference generator 190 with combination of time averaging and frequency averaged phase drift correction. A first step in the subcarrier reference generator is to estimate the phase drift error and obtain a frequency averaged error for each symbol, at step 725. The averaged error determined for a given symbol is used to correct the subcarrier references for all the channels at the time of that symbol. The phase drift corrected subcarrier references are then used by function 735 to obtain weighted time averages of new and prior subcarrier reference values for each subcarrier. As shown by function 745, these accurate subcarrier references are used for the comparison with the raw noisy values of the characters of each symbol to decide the discrete values of each character, shown by function 745. The corrected subcarrier references are fed back within the subcarrier reference generator for use in the various functions.

This combination can simultaneously combat additive white Gaussian noise and phase-noise. The amount of benefit will depend on the type of system and its parameters. The phase noise of a laser is usually measured by its spectral linewidth. Assuming that this is lorentzian, the beneficial combined effects of the decision directed averaging algorithm and the phase correction algorithm working together can be considerable for linewidths of the order of 200 kHz in systems of about 5 GSamples/s. The phase noise error correction algorithm on its own can reduce a penalty of 1 dB in OSNR to about 0.25 dB. For this linewidth the decision directed averaging process in conjunction with the phase equalisation scheme, with averaging over two samples, (approx equivalent to AV=0.5) an improvement of 1 dB of OSNR was seen over the standard performance of DQPSK (with an ideal laser). A loss of only ~0.4 dB was seen with respect to the averaged-DQPSK with the same AV(=0.5). The OSNR for a BER of $10^{-3}$ for 10 Gbs-OFDM-DQPSK can be close to 4.3 dB/0.1 nm for a linewidth of 200 kHz. Both phase noise equalization and decision directed averaging are used to achieve this value. This is ~1 dB better than standard DQPSK.

Concluding Remarks

Although the reference generators have been illustrated for the case where pilot tones are not used, in principle these techniques can be combined with the use of a pilot tone either to generate the subcarrier references, or to verify or correct references that have been generated from the raw symbols.

Embodiments of this invention can enable improvements in Optical OFDM, to provide a highly flexible and scalable optical communication system. Optical OFDM can show resilience to high levels of linear distortion (chromatic and polarisation mode dispersion). This will enable transmission over highly dispersive channels without the need of costly optical compensators. Embodiments of this invention can complement OFDM by enabling high reach and/or increased margins by means of better system resilience to amplification noise and reduced source coherence. Increasing the noise resilience of the communication system has important commercial implications in terms of the final cost of the transmission system. For instance, improving the noise resilience by a factor of 1.6 (2 dB) will enable transmission line operators to reduce their capital and running cost expenditures in optical amplifiers by the same factor. In summary, OFDM cost savings can now relate not only to reduction or removal of linear distortion compensators in the transmission line, but also to a reduced number of required amplifiers as a result of being able to exploit the coherent detection limit without capacity penalties due to transmitted overheads.

It can also be applied to generating subcarrier references for non optical OFDM receivers such as radio systems, particularly in cases where phase noise or phase drift is an issue.

As has been described above, an optical receiver demodulates optical orthogonal frequency division multiplexed signals and generates a number of subcarrier reference signals, each for demodulating a frequency channel of the frequency division multiplexed signals. It compensates for degradations in the generated reference signals by averaging a number of estimates derived from different inputs to make the references more resilient to degradations. It can encompass time averaging to compensate for amplification noise, and frequency averaging of phase drift estimation to compensate for phase drift caused by reduced source coherence. It can enable longer system reach and/or increased optical power margins by means of better system resilience to amplification noise and reduced source coherence. The bit error rate can be reduced, and/or the capacity can be increased by increasing bit rate or introducing more frequency channels.

Other variations will be apparent to those skilled in the art, having corresponding advantages to those set out above, within the scope of the claims.

The invention claimed is:

1. An optical receiver arranged to receive and demodulate optical orthogonal frequency division multiplexed signals, and comprising
a subcarrier reference generator arranged to generate a number of subcarrier reference signals, each for use in demodulating a different one of a number of frequency channels of the frequency division multiplexed signals,
the subcarrier reference generator further being arranged to compensate for degradations in the generated reference signals by averaging a number of estimates derived from different inputs.

2. The optical receiver of claim 1, the generator being arranged to compensate for phase drift by determining estimates at a number of different frequencies and averaging these estimates.

3. The optical receiver of claim 1, the generator being arranged to compensate for noise by determining estimates for a given one of the reference signals at a number of different times and averaging these estimates.

4. The optical receiver of claim 1, the generator being arranged to compensate for phase drift by determining estimates at a number of different frequencies and averaging these estimates, and to compensate for noise by determining estimates for a given one of the reference signals at a number of different times and averaging these estimates.

5. The optical receiver of claim 1, arranged to demodulate differentially coded optical orthogonal frequency division multiplexed signals, the generator being arranged to operate without using a transmitted pilot tone.

6. The optical receiver of claim 1, arranged to demodulate non differentially coded optical orthogonal frequency division multiplexed signals.

7. The optical receiver of claim 1, the generator being arranged to generate estimated reference signals by stripping detected data from a received signal for each channel.

8. The optical receiver of claim 1, the generator being arranged to generate an estimated phase drift by estimating a rotation of a constellation of points represented in a complex frequency domain.

9. The optical receiver of claim 8, being arranged to receive signals carrying data values which have been encoded before transmission by a rotation in a complex frequency domain, relative to other data values and the receiver having a decoder for decoding by using the other data values to determine an amount of rotation of the received data values, needed to decode the data values.

10. A subcarrier reference generator for a demodulator for orthogonal frequency division multiplexed signals, comprising a generator arranged to generate a number of subcarrier reference signals, each for use in demodulating a different one of a number of frequency channels of the frequency division multiplexed signals,
the subcarrier reference generator further being arranged to compensate for degradations in the generated reference signals by averaging a number of estimates derived from different inputs.

11. The subcarrier reference generator of claim 10, arranged to demodulate differentially coded optical orthogonal frequency division multiplexed signals, and being arranged to operate without using a transmitted pilot tone.

12. A subcarrier reference generator for generating subcarrier reference signals for use in demodulating optically transmitted orthogonal frequency division multiplexed signals, comprising means for generating a number of subcarrier reference signals, each for use in demodulating a different one of a number of frequency channels of the frequency division multiplexed signals,
and comprising means for compensating for degradations in the generated reference signals by averaging a number of estimates derived from different inputs.

13. An optical receiver arranged to receive and demodulate optical orthogonal frequency division multiplexed signals carrying QAM data values encoded by a mapping in a complex frequency domain according to corresponding other data values, the receiver comprising
a subcarrier reference generator arranged to generate a number of subcarrier reference signals, the subcarrier reference generator further being arranged to compensate for degradations in the generated reference signals by averaging a number of estimates derived from different inputs,
a demodulator for demodulating the optical orthogonal frequency division multiplexed signals using each of the subcarrier reference signals for a respective frequency channel of the frequency division multiplexed signals, and
a decoder for decoding after the demodulating, by determining from the corresponding other data values, an inverse mapping in the complex frequency domain needed to decode the data values.

14. The optical receiver of claim 13, the mapping and inverse mapping comprising a rotation.

15. The optical receiver of claim 14, the rotation being any of 0, 90, 180, or 270 degrees.

16. A method of generating subcarrier reference signals for use in demodulating optically transmitted orthogonal frequency division multiplexed signals, comprising the steps of generating a number of subcarrier reference signals, each for use in demodulating a different one of a number of frequency channels of the frequency division multiplexed signals,
and compensating for degradations in the generated reference signals by averaging a number of estimates derived from different inputs.

17. The method of claim 16, including a step of compensating for phase drift by determining estimates at a number of different frequencies and averaging these estimates.

18. A method of offering a data transmission service over an optical link, comprising the steps of transmitting data using optical orthogonal frequency division multiplexed signals, and receiving data using an optical receiver having a subcarrier reference generator arranged to generate a number of subcarrier reference signals, each for use in demodulating a different one of a number of frequency channels of the frequency division multiplexed signals,
the subcarrier reference generator further being arranged to compensate for degradations in the generated reference signals by averaging a number of estimates derived from different inputs.

* * * * *